United States Patent
Devlieghere et al.

(10) Patent No.: US 9,171,238 B2
(45) Date of Patent: Oct. 27, 2015

(54) IMAGE PROCESSING SYSTEM AND METHOD GENERATING LANE BITMAP ELEMENTS AND RECEIVING POSITION DATA TO ADJUST POSITION OF LANE IMAGES IN THE PRINTED IMAGE

(71) Applicant: Xeikon IP BV, GZ Eede (NL)

(72) Inventors: Jürgen Norbert Bart Devlieghere, Borgerhout (BE); Marc Lodewijk Cornelia Goetschalckx, Lint (BE)

(73) Assignee: Xeikon IP BV (NL)

( * ) Notice: Subject to any disclaimer, the term of this patent is extended or adjusted under 35 U.S.C. 154(b) by 0 days.

(21) Appl. No.: 14/301,634

(22) Filed: Jun. 11, 2014

(65) Prior Publication Data

US 2015/0015901 A1 Jan. 15, 2015

(30) Foreign Application Priority Data

Jul. 15, 2013 (EP) .................................... 13176488

(51) Int. Cl.
- *G06K 15/02* (2006.01)
- *H04N 1/387* (2006.01)
- *H04N 1/00* (2006.01)
- *H04N 1/23* (2006.01)

(52) U.S. Cl.
CPC .......... *G06K 15/1872* (2013.01); *G06K 15/024* (2013.01); *G06K 15/1848* (2013.01); *G06K 15/1894* (2013.01); *H04N 1/00912* (2013.01); *H04N 1/233* (2013.01); *H04N 1/387* (2013.01)

(58) Field of Classification Search
None
See application file for complete search history.

(56) References Cited

U.S. PATENT DOCUMENTS

| | | | |
|---|---|---|---|
| 4,718,784 A | 1/1988 | Drisko | |
| 5,113,267 A * | 5/1992 | Lee | 358/450 |
| 6,650,791 B1 * | 11/2003 | Cullen | 382/294 |
| 7,365,743 B1 * | 4/2008 | Chen et al. | 358/1.13 |
| 7,791,778 B2 * | 9/2010 | Kishi | 358/538 |
| 8,599,429 B2 * | 12/2013 | Sakuraba | 358/1.18 |
| 8,861,014 B2 * | 10/2014 | Bellert | 358/1.15 |
| 2004/0196483 A1 * | 10/2004 | Jacobsen | 358/1.13 |

OTHER PUBLICATIONS

European Search Report in corresponding European Application No. 13176488.8-1811 completed Jan. 6, 2014 (6 pages).

* cited by examiner

*Primary Examiner* — Scott A Rogers
(74) *Attorney, Agent, or Firm* — Andrew J. Anderson, Esq.; Harter Secrest & Emery LLP

(57) ABSTRACT

Image processing system for generating control signals for printing means, from source image data from an image source, comprising a raster image processing and layout module configured to convert said source image data into a first lane bitmap element and a second lane bitmap element; a streaming processor arranged to receive said first lane bitmap element and said second lane bitmap element, and position signals comprising position data for said first and/or said second lane image in the printed image; said streaming processor being configured to generate control signals for the printing means based on said first lane bitmap element, said second lane bitmap element, and said position signals in order to be able to adjust the position of said first lane image and/or the position of the second lane image in the printed image.

20 Claims, 4 Drawing Sheets

IMAGE PROCESSING SYSTEM AND METHOD GENERATING LANE BITMAP ELEMENTS AND RECEIVING POSITION DATA TO ADJUST POSITION OF LANE IMAGES IN THE PRINTED IMAGE

TECHNICAL FIELD

The present invention relates to an image processing system and to a method for generating control signals for printing means, from source image data from an image source.

BACKGROUND OF THE INVENTION

In prior art image processing systems, when generating a ready-to-print file or bitmap from source image data from an image source, typically the ready-to-print file is generated for the full width of the printing apparatus. Such a ready-to-print file is sent to a streaming processor in order to generate control signals for the printing means based on the ready-to-print file. When printing small images such as labels or prints for small packages, it is known to group those small images into a single image file, e.g. a PDF file, whereupon this single image file is raster-image processed in order to obtain a ready-to-print file for a streaming processor. Typically such small images have to be cut out from the printed substrate. A problem with the known printing processors is that the substrate material may shrink or stretch during fusing. This results in small images no longer being aligned properly for the finishing operation following the printing operation. The finishing operation may involve e.g. a cut-out, a slitting, a folding, a scoring, a marking, or any combination thereof.

An object of embodiments of the invention is to provide an image processing system and method allowing avoiding alignment problems between finishing means and images present on a printed substrate.

SUMMARY OF THE INVENTION

According to a first aspect of the invention, there is provided an image processing system for generating control signals for printing means, e.g. a plurality of printing heads or a LED array, from source image data from an image source. The image processing system comprises a raster image processing and layout module and a streaming processor. The raster image processing and layout module is configured to convert the source image data into a first lane bitmap element, and into a second lane bitmap element. The first lane and the second lane extend in a printing direction and form adjacent lanes in the printed image. The source image data represent data of a first and second lane image to be printed in the first and second lane, respectively. The first lane bitmap element comprises at least one bitmap of the source image data associated with said first lane, and the second lane bitmap element comprises at least one bitmap of the source image data associated with said second lane. The streaming processor is arranged to receive the first lane bitmap element and the second lane bitmap element, and position signals comprising position data for the first and/or second lane image in the printed image. The streaming processor is configured to generate control signals for the printing means based on the first lane bitmap element and the second lane bitmap element, and on the position signals in order to be able to adjust the position of the first lane image and/or the position of the second lane image in the printed image.

Embodiments of the invention are based inter alia on the inventive insight that by using lanes, it becomes possible to adjust the position of adjacent small images independently of each other. It is noted that the image processing system is defined above as a two-lane system. However, the concept of the invention is equally applicable for a multilane system comprising more than two lanes.

Embodiments of the invention are both applicable with inkjet heads as well as with light heads such as a LED array, and more generally, with any printing means.

In a preferred embodiment, the streaming processor is configured to receive first and second position signals, and to use said first and second position signals for generating the control signals in order to adjust the position of said first lane image and said second lane image independently in the printed image. Preferably, the first and second position data indicate a translation along a width direction perpendicular to the print direction, for the first lane image and the second lane image, respectively. In other words, the position data preferably indicates whether a lane image should be moved to the left or to the right in the printed image.

In a preferred embodiment, the raster image processing and layout module is configured to be able to convert source image data into a first and second lane bitmap element having a first width and a second possibly different width seen in a direction perpendicular to the print direction, respectively. More in particular the raster image processing and layout module may comprise a raster image processing part configured to convert source image data in image bitmaps having a width; and a layout part configured to determine a suitable number of lanes and a suitable width of the number of lanes taking into account the widths of the image bitmaps, and to convert said image bitmaps in a number of image lane bitmap elements corresponding to the determined number of lanes.

Preferably, the image processing system further comprises measurement means adapted for measuring the position of the first lane image and the second lane image in the printed image; and position calculation means configured for generating the position signals based on the measured position of the first lane image and the second lane image in the printed image. In that way, the position signals can be generated automatically based on mismatch measurements. According to other variants of the invention, the position signals may be generated based on a manual input. Such a manual input may e.g. be based on a known amount of shrinking or stretching of the substrate material. If an automatic measuring system is used, the measurement means could comprise e.g. a camera.

In further developed embodiments, the streaming processor is further configured to receive instruction signals, and to use said instruction signals for generating additional printing patterns, such as cutting marks or a calibration strip, in the printed image.

In a possible embodiment, the raster image processing and layout module comprises an input interface configured for receiving a plurality of print jobs, each job of said plurality of jobs defining at least an image and a desired number of copies; and an output interface for outputting the first lane bitmap element and the second lane bitmap element to the streaming processor. The raster image processing and layout module is configured to generate the first lane bitmap element and second lane bitmap element, such that they each comprise one or more images from one or more respective print jobs. Preferably, the raster image processing and layout module is configured to generate the first and second lane bitmap element, such that they each comprise a bitmap of each different image to be included in the respective lane, and a desired number of copies of each different image.

In a possible embodiment the raster image processing and layout module comprises a first raster image processor associated with a first lane; said first raster image processor being configured to convert first lane image data of said source image data into the first lane bitmap element; and a second raster image processor associated with a second lane; said second raster image processor being configured to convert second lane image data of said source image data into the second lane bitmap element.

According to a second aspect of the invention, there is provided an image processing method for generating control signals for printing means from source image data from an image source. Source image data associated with a first lane is converted into a first lane bitmap element. Similarly, source image data associated with a second lane is converted into a second lane bitmap element. The method further comprises receiving position signals comprising position data for said first and/or said second lane image in the printed image; and generating control signals for the printing means based on said first lane bitmap element and said second lane bitmap element, and on said position signals in order to adjust the position of said first lane image and/or said second lane image in the printed image.

In preferred embodiments, the source image data comprise a plurality of labels and the converting is done such that said labels are located below each other seen in the printing direction in said first and said second lane. Each label is preferably associated with a cut-out contour.

Preferably, the first and second position signals comprise information on position corrections to be performed for the first and second lane images in the printed image, respectively. The first and second position signals used for generating the adjusted control signals in order to adjust the position of the first lane image independently of the position of the second lane image and vice versa. Preferably, the first and second position data indicate a translation to be performed along a width direction perpendicular to the print direction on the first lane image and the second lane image, respectively.

In preferred embodiments, the position of the first lane image and the second lane image in the printed image is measured, and the position signals are generated based on the measured position of the first lane image and the second lane image in the printed image. In that way, a fully automated image processing method can be obtained, where the position of the first and second lane images are continuously monitored and corrected if necessary.

According to an embodiment the first and second lane bitmap element have a first width and a second different width seen in a direction perpendicular to the print direction.

According to an embodiment the method further comprises measuring the position of the first lane image and the second lane image in the printed image; and generating the position signals based on the measured position of the first lane image and the second lane image in the printed image.

According to an embodiment the measuring is done using a camera.

According to an embodiment instruction signals are received and used for generating additional printing marks, such as cut marks or a calibration strip, in the printed image.

According to an embodiment the method further comprises receiving a plurality of print jobs, each job of said plurality of jobs defining at least an image and a desired number of copies; wherein the first lane bitmap element and second lane bitmap element are generated, such that they each comprise one or more bitmaps of one or more images from one or more respective print jobs.

According to another aspect there is provided a digital data storage medium encoding a machine-executable program of instructions to perform any one of the embodiments of the method disclosed above.

BRIEF DESCRIPTION OF THE DRAWING FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings.

DETAILED DESCRIPTION OF THE INVENTION

Figure 1:
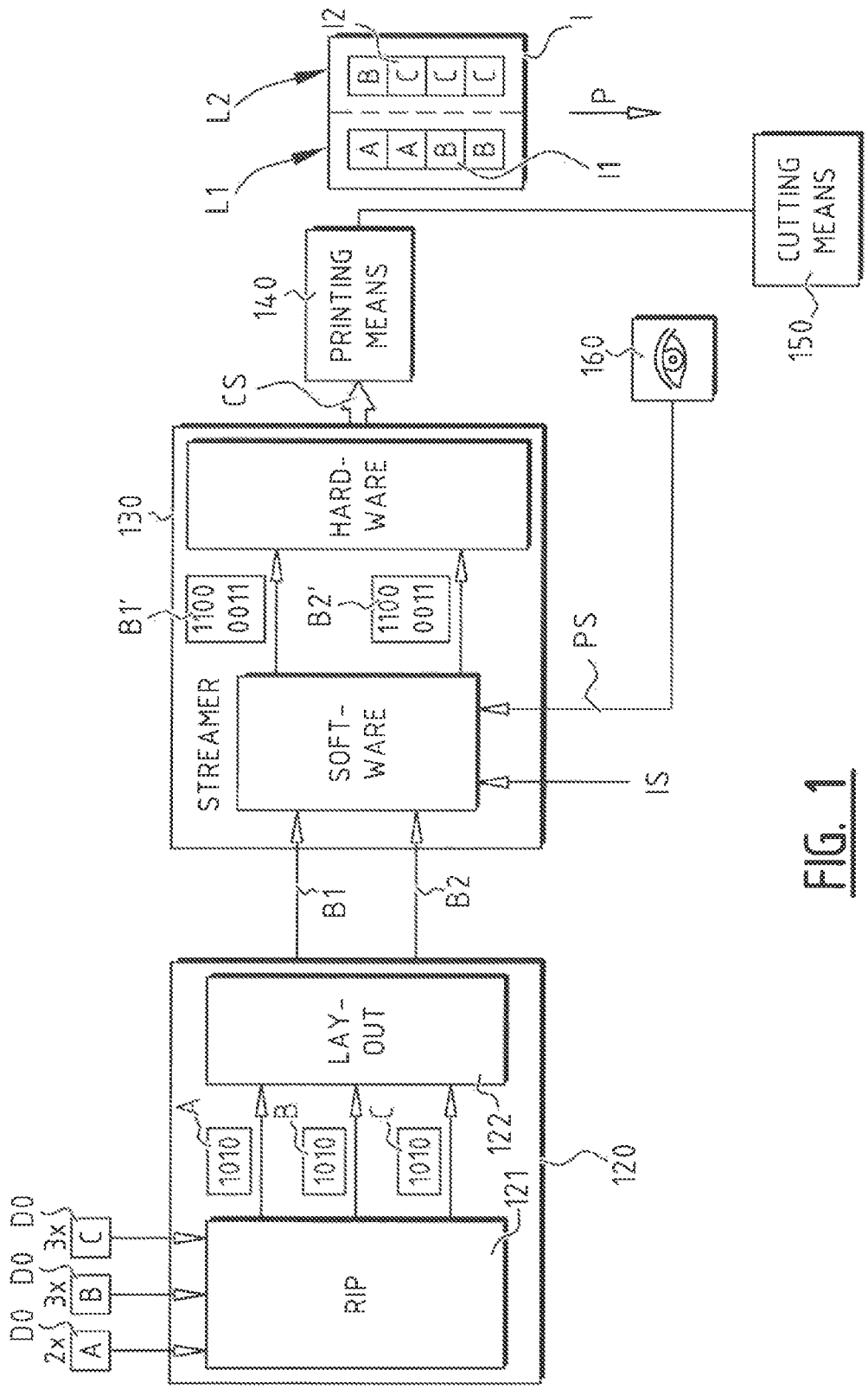
FIG. 1 is schematic block diagram of a printing and cutting arrangement including an embodiment of an image processing system of the invention.

FIG. 1 illustrates a printing and cutting arrangement including an embodiment of an image processing system of the invention. The image processing system comprises a raster image processing and layout module 120, a streamer 130, and a measurement and position correction calculation means 160. The printing and cutting arrangement further comprises a printing means 140 and a cutting means 150.

When a plurality of small images needs to printed, it is known to group those images according to print patterns so that the full surface area of the substrate is used. In the illustrated embodiment the small images A, B, C are grouped into a first lane L1 and a second lane L2. Source image data D0 of the small images are first raster image processed in a RIP part 121 to obtain bitmaps of the small images A, B, and C, and next grouped and laid out to obtain first and second lane bitmap elements B1, B2 representing data of a first and second lane image to be printed in the first and second lane L1, L2, respectively. The first lane L1 and the second lane L2 extend in a printing direction P and correspond with adjacent lanes in a printed image I.

The raster image processing and layout module 120 is configured to convert the source image data D0 into a series of first lane bitmap elements B1 and a series of second lane bitmap elements B2. The streaming processor or streamer 130 is arranged to receive the first lane bitmap elements B1 and the second lane bitmap elements B2, together with position signals PS comprising information on position data for said first and/or said second lane image in the printed image. The streaming processor 130 is configured to generate control signals CS for the printing means 140 based on the first lane bitmap element B1 and the second lane bitmap element B2, using the position signals in order to obtain a correct position of the first lane image I1 and the second lane image I2 in the printed image P.

The raster image processing and layout module 120 comprises an input interface for receiving a plurality of print jobs, each job defining e.g. an image, a cut-out contour, and a desired number of copies. The RIP part 120 rips the received images and outputs the resulting bitmaps to a layout part 122 which arranges the bitmaps in lanes and generates the first bitmap elements B1 associated with the first lane and the second bitmap elements B2 associated with the second lane. Optionally the layout part may also generate first lane cut-out contour data and second lane cut-out contour data comprising one or more cut-out contours from one or more respective print jobs, which first and second lane cut-out contour data is generated to match the first and second lane bitmap elements. The raster image processing and layout module 120 further comprises an output interface for making the first lane bitmap elements B1 and the second lane bitmap elements B2 available to the streamer 130.

The layout module 122 is preferably configured to prepare the first and second lane bitmap elements B1 and B2 as follows. For the first lane the following information is grouped in the first lane bitmap element B1:
- the bitmap of image A, together with the number of copies that need to be printed in the first lane;
- the bitmap of image B, together with the number of copies that need to be printed in the first lane.

The first lane bitmap element B1 may be represented as (A,2×;B,2×).

For the second lane the following information is grouped in the second lane bitmap element B2:
- the bitmap of image B, together with the number of copies that need to be printed in the second lane;
- the bitmap of image C, together with the number of copies that need to be printed in the second lane.

The second lane bitmap element B2 may be represented as (B,1×;C,3×).

Optionally such a lane bitmap element B1, B2 may comprise information about the space between two consecutive bitmaps, the position of a first included bitmap with respect to a second included bitmap, etc. Also, if a number of identical lane bitmap elements need to be printed, a lane bitmap element may comprise an indication of the number of times that the lane bitmap element needs to be printed.

It is noted that the bitmaps associated with a first lane may have a width different from the width of the small images A and B in the source data D0. Also, if small images A and B have different widths, there may be provided "empty" portions adjacent a small image having the smallest width in the lane bitmap element.

The layout part 122 may be configured to group small images having the same width in the lane bitmap element associated with a particular lane.

In an alternative embodiment the layout module may be configured to prepare the first and second lane bitmap elements B1 and B2 as follows. For the first lane all bitmaps to be printed may be grouped to form a single bitmap corresponding to the complete first lane. The first lane bitmap element B1 may then be represented as (AABB). Also for the second lane all bitmaps to be printed may be grouped to form a single bitmap corresponding to the complete second lane. The second lane bitmap element B2 may then be represented as (BCCC). As for the embodiment above it is noted that the width of (AABB) may be different from the width of (BCCC), and empty portions may have been introduced in the lane bitmap elements as needed.

A raster image processor (RIP) is a component used in an image processing system which produces a raster image also known as a bitmap. The input may be a page description in a high-level page description language such as PostScript, Portable Document Format, XPS or another bitmap. In the latter case, the RIP applies either smoothing or interpolation algorithms to the input bitmap to generate the output bitmap. Raster image processing is the process of turning e.g. vector digital information such as a PostScript file into a high-resolution raster image. RIPs may be implemented through hardware generating a hardware bitmap which is used to enable or disable each pixel on a real-time output device such as an optical film scanner. However, usually a RIP is implemented either as a software component of an operating system or as a firmware program executed on a microprocessor inside a printer. According to a variant a stand-alone hardware RIP may be used.

Figure 3:
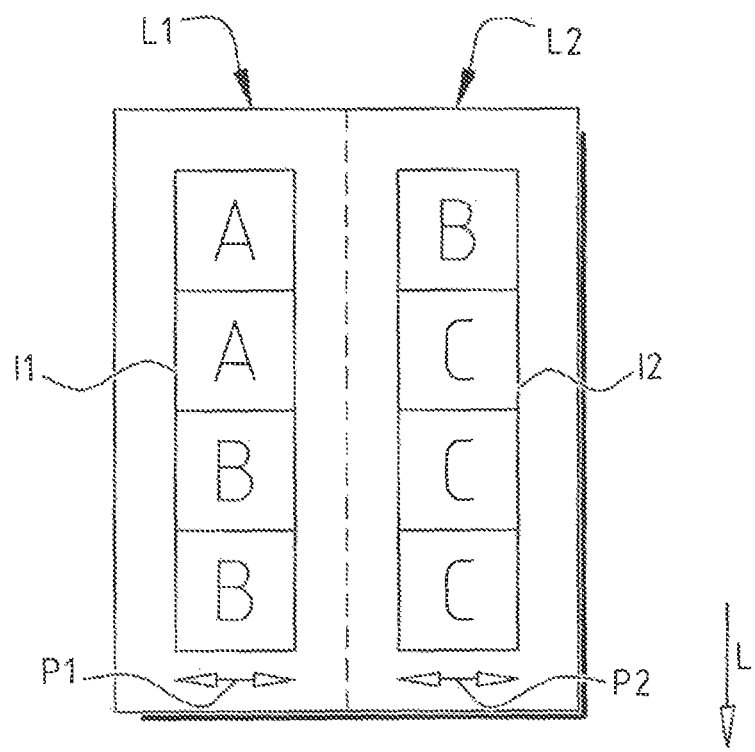
FIG. 3 illustrates schematically the result of embodiments of the invention.

Preferably the streaming processor 130 is configured to receive first and second position signals PS and to use said first and second position signals for generating the control signals in order to be able to adjust independently the position of said first lane image and said second lane image. This is illustrated in FIG. 3. It is advantageous if the position of first lane image I1 can be controlled independently of the position of the second lane image I2, and vice versa, see arrows P1 and P2 in FIG. 3. Preferably the first and second position signals indicate a translation to be performed along a width direction (direction of the arrows P1, P2) perpendicular to the print direction P for the bitmaps of the first lane bitmap element and the second lane bitmap element, respectively.

Figures 2A, 2B:
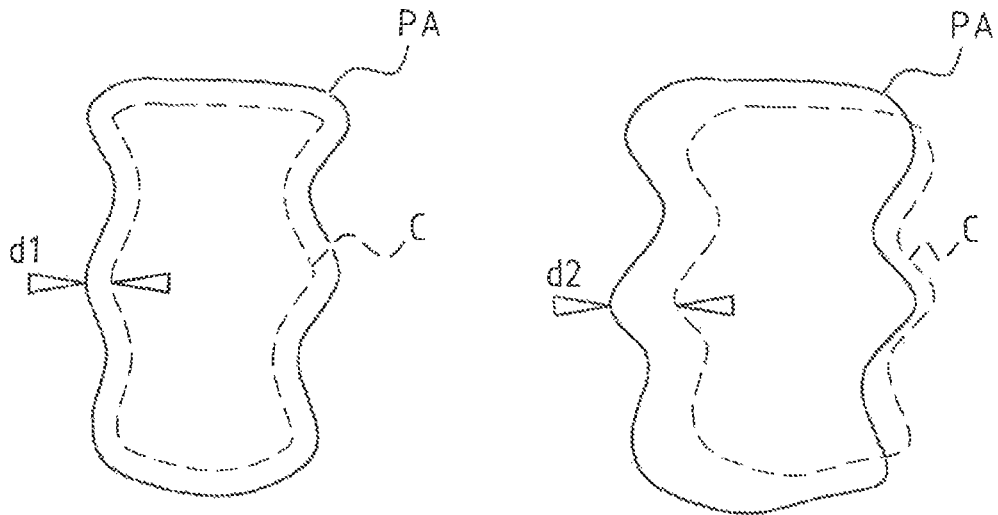
FIGS. 2A and 2B illustrate schematically two views of a printing area and a cutting contour.

In an ideal situation, when a substrate arrives at the cutting means, the printed area PA should be aligned with respect to the cut-out contour C, see FIG. 2A. However for different reasons, e.g. shrinkage of the substrate during fusing, the printed area PA may not be aligned with the cut-out contour C, see FIG. 2B. This misalignment (d2−d1) may be used as a measure for correcting the position of the first and/or second lane image I1, I2.

The measurement and position correction calculation means 160 measure position data, e.g. the above discussed misalignment (d2−d1), and calculate the required correction which is communicated in the form of a position correction signal to the streaming processor. To perform the position measurements e.g. a camera may be used. According to an alternative non-illustrated variant the position correction signal may be generated on the basis of a manual input by an operator. The operator may e.g. input a correction value which will typically be dependent on the type of the substrate material that is being used.

In the illustrated embodiment the first and second lane image I1, I2 have the same width, but the skilled person understands that first and second lane images having different widths seen in a direction perpendicular to the print direction P, are equally possible. Also, instead of using two lanes, three or more lanes may be used.

Optionally the streaming processor 130 may be further configured to receive instruction signals IS and to use the instruction signals for generating the control signals CS. Those instruction signals may relate to the adding of marks, such as cut marks, or other data, e.g. numbering, on a per lane basis or to calibration operations.

Figure 5:
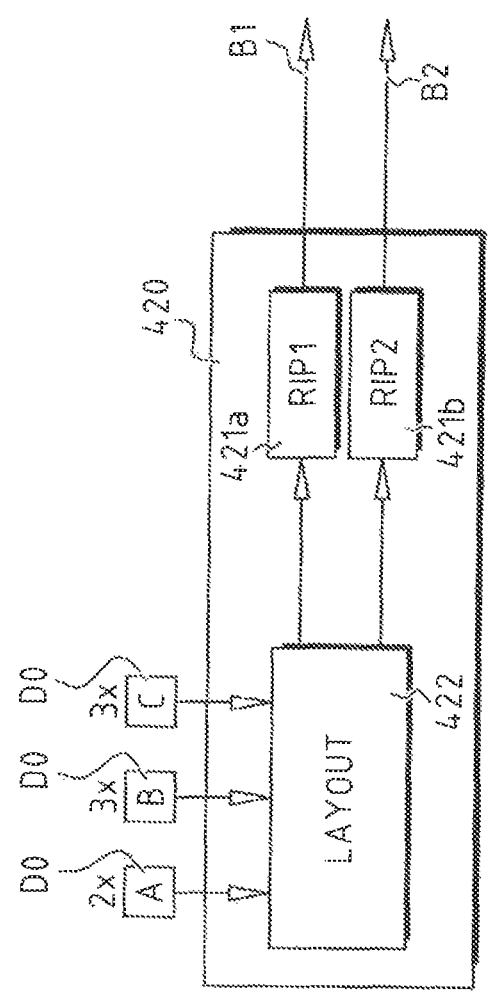
FIG. 5 is schematic block diagram of another embodiment of an image processing system of the invention.

FIG. 5 illustrates another variant of a raster image processing and layout module 420 of the invention. In this embodiment there is provided a layout part 422 downstream of two raster image processors (RIP1 and RIP2) 421*a* and 421*b*. First the received small images A, B and C are arranged in lanes in the layout part 422, and next the images for the first and second lane are provided to RIP1 and RIP2, respectively. The layout part 422 could be configured to group small images having the same width in the same lane. It is noted that the images corresponding to the first (second) lane may be provided to RIP1 (RIP2) in the form of a lane element comprising all information needed to print a complete lane. E.g. a lane element for the first lane would comprise image A, image B, and an indication of the number of copies, here 2×A and 2×B. Optionally such a lane element may comprise information about the space between two consecutive images, the position of a first included image with respect to a second included image, etc. Also, if a number of identical lane elements needs to be printed, a lane element may comprise an indication of the number of times that a lane element needs to be printed. Alternatively the images corresponding to the first (second) lane may be provided to RIP1 (RIP2) in the form of a lane element comprising a single image AABB (BCCC).

RIP1 and RIP2 could be arranged to raster image process the one or more small images of a lane element individually in order to build a lane bitmap element comprising the bitmaps of the individual image(s) and the desired number of copies of each individual image, e.g. (A,2×;B,2×) and (B,1×;C,3×) as discussed above in connection with FIG. 1. Alternatively, RIP1 and RIP2 could be arranged to raster image process a complete lane element AABB, BCCC, resulting in a lane bitmap element in the form of a single bitmap of a complete lane.

In the illustrated example the one or more bitmaps of the first lane bitmap element B1 may have a different width compared to the one or more bitmaps of the second lane bitmap element B2.

Figure 4:
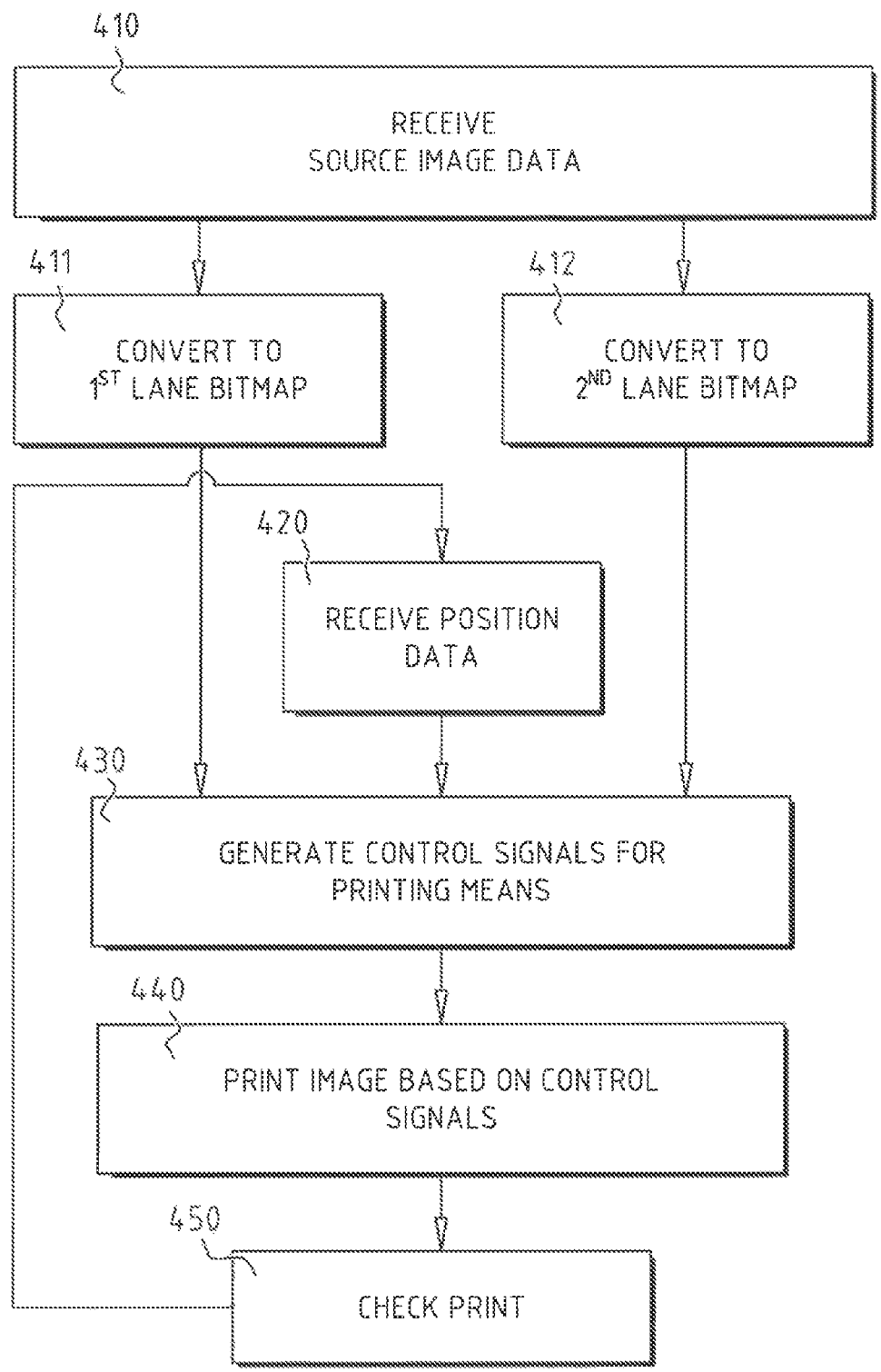
FIG. 4 is a flow chart of an embodiment of the method of the invention.

FIG. 4 illustrates an embodiment of an image processing method for generating control signals for printing means, from source image data from an image source. In a first step 410 source image data are received. In a second step 411, 412, the source image data is converted into a first lane bitmap element, and into a second lane bitmap element. The source image data represent data of a first and second lane image to be printed in a first and second lane, respectively. In a further step 420 position data for said first and/or said second lane bitmap elements are received. Based on said first lane bitmap and said second lane bitmap elements, and on said position data, control signals are generated for the printing means, see step 430. Taking into account position data, makes it possible to adjust the position of the first lane image and/or the second lane image in the printed image. In a next step 440 an image is printed on the basis of the generated control signals. In a final step 450 the printed image may be checked for misalignment, and the result of this checking may be used to set the position data. Typically, first and second position correction data are used indicating a translation to be performed along a width direction perpendicular to the print direction on the first lane bitmap element and the second lane bitmap element, respectively.

In a typical embodiment the source image data comprise a plurality of labels which are arranged by the raster image processing and layout module 120 so that they are located in at least two lanes, below each other seen in the printing direction, each label being associated with a cut-out contour. In FIG. 1 the labels are illustrated as "A", "B", and "C".

Particular embodiments of the invention relate to the field of digital printing systems for so-called "continuous" webs, i.e. printing systems where a continuous roll of substrate (e.g., paper, plastic foil, or a multi-layer combination thereof) is run through the printer, in particular to print large numbers of copies of the same image(s), or alternatively, series of images, or even large sets of individually varying images. In such embodiments, an image to be printed is defined on a plate, which is arranged around a cylinder in such a way as to stamp a copy of the image onto the relevant portion of the web upon each revolution of the cylinder. When these continuous webs have to be subjected to a subsequent mechanical cut-out operation (e.g., to cut contours in the top layer of a multi-layer substrate, so as to produce peel-off adhesive labels), it is conventional to also define the cut-out pattern as a plate which repetitively imposes the same cut-out pattern onto the relevant portion of the passing substrate. The same logic is presently being applied to laser cutters, which do not use a physical roll with cutting edges, but which nevertheless use a cutting pattern defined as a single "plate area" which is repeatedly applied.

A person of skill in the art would readily recognize that steps of various above described methods can be performed by programmed computers. Herein, some embodiments are also intended to cover program storage devices, e.g., digital data storage media, which are machine or computer readable and encode machine executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

Whilst the principles of the invention have been set out above in connection with specific embodiments, it is to be understood that this description is merely made by way of example and not as a limitation of the scope of protection which is determined by the appended claims.

The invention claimed is:

1. Image processing system for generating control signals for printing means, from source image data from an image source, comprising:
   a raster image processing and layout module configured to convert said source image data into a first lane bitmap element and a second lane bitmap element; wherein a first lane and a second lane extend in a printing direction and are adjacent lanes in a printed image; said source image data representing data of a first and second lane image to be printed in said first and second lane, respectively; and said first and second lane bitmap element comprising at least one bitmap of said source image data associated with said first and second lane, respectively;
   a streaming processor arranged to receive said first lane bitmap element and said second lane bitmap element, and position signals comprising position data for said first and/or said second lane image in the printed image; said streaming processor being configured to generate control signals for the printing means based on said first lane bitmap element, said second lane bitmap element, and said position signals in order to be able to adjust the position of said first lane image and/or the position of the second lane image in the printed image.

2. Image processing system of claim 1, wherein said streaming processor is configured to receive first and second position signals comprising first and second position data for said first and said second lane image, respectively; and to use said first and second position signals for generating the control signals in order to be able to adjust the position of said first lane image and said second lane image independently.

3. Image processing system of claim 2, wherein said first and second position data indicate a translation to be performed along a width direction perpendicular to the print direction for the first lane bitmap element and the second lane bitmap element, respectively.

4. Image processing system of claim 1, wherein said raster image processing and layout module is configured to be capable of converting source image data, into a first and second lane bitmap element having a first width and a second width seen in a direction perpendicular to the print direction, respectively, said first width being different from said second width.

5. Image processing system of claim 1, further comprising measurement means adapted for measuring the position of the first lane image and the second lane image in a printed image; and position correction calculation means configured for generating the position signals based on the measured position of the first lane image and the second lane image.

6. Image processing system of claim 5, wherein said measurement means comprises a camera.

7. Image processing system of claim 1, wherein said streaming processor is further configured to receive instruction signals and to use said instruction signals for generating additional printing marks, such as cut marks or a calibration strip, in a printed image.

8. Image processing system of claim 1, wherein the raster image processing and layout module comprises an input interface configured for receiving a plurality of print jobs, each job of said plurality of jobs defining at least an image and a desired number of copies; and an output interface for outputting the first lane bitmap element and the second lane bitmap element to the streaming processor, wherein the raster image processing and layout module is further configured to generate the first lane bitmap element and second lane bitmap element, such that they each comprise a bitmap of one or more images from one or more respective print jobs.

9. Image processing system of claim 8, wherein said raster image processing and layout module is configured to generate said first and second lane bitmap element, such that they each comprise a bitmap of each different image to be included in the respective lane, and a desired number of copies of each different image.

10. Image processing system of claim 1, wherein said source image data comprise a plurality of labels, and said raster image processing and layout module is configured to arrange said labels such that they appear below each other seen in the printing direction in said first lane image and said second lane image.

11. Image processing system of claim 1, wherein said raster image processing and layout module comprises a first raster image processor associated with a first lane; said first raster image processor being configured to convert first lane image data of said source image data into the first lane bitmap element; and
a second raster image processor associated with a second lane; said second raster image processor being configured to convert second lane image data of said source image data into the second lane bitmap element.

12. Image processing method for generating control signals for printing means, from source image data from an image source, comprising:
converting source image data associated with a first lane into a first lane bitmap element;
converting source image data associated with a second lane into a second lane bitmap element;
said first lane and second lane extending in a printing direction and corresponding with adjacent lanes in a printed image; and said source image data representing data of a first and second lane image to be printed in said first and second lane, respectively;
receiving position signals comprising information on position data for said first and/or said second lane image in the printed image; and
generating control signals for the printing means based on said first lane bitmap element and said second lane bitmap element, and on said position signals in order to adjust the position of said first lane image and/or said second lane image in the printed image.

13. Image processing method of claim 12, wherein said source image data comprise a plurality of labels, and said converting is done such that said labels are located below each other seen in the printing direction in said first and said second lane, each label being associated with a cut-out contour.

14. Image processing method of claim 12, wherein first and second position signals comprising information on position corrections to be performed on said first and second lane image in the printed image, respectively, are received and used for generating adjusted control signals in order to adjust the position of said first lane image and said second lane image independently, wherein preferably said first and second position signals indicate a translation to be performed along a width direction perpendicular to the print direction on the first lane bitmap element and the second lane bitmap element, respectively.

15. Image processing method of claim 13, wherein first and second position signals comprising information on position corrections to be performed on said first and second lane image in the printed image, respectively, are received and used for generating adjusted control signals in order to adjust the position of said first lane image and said second lane image independently, wherein preferably said first and second position signals indicate a translation to be performed along a width direction perpendicular to the print direction on the first lane bitmap element and the second lane bitmap element, respectively.

16. A non-transitory computer readable medium storing a computer program comprising computer-executable instructions for performing a method according to claim 12, when the computer program is run on a computer.

17. Image processing system for generating control signals for printing means, from source image data from an image source, comprising:
a raster image processing and layout module configured to convert said source image data into a first lane bitmap element and a second lane bitmap element; wherein a first lane and a second lane extend in a printing direction and are adjacent lanes in a printed image; said source image data representing data of a first and second lane image to be printed in said first and second lane, respectively; and said first and second lane bitmap element comprising at least one bitmap of said source image data associated with said first and second lane, respectively;
a streaming processor arranged to receive said first lane bitmap element and said second lane bitmap element, and position signals comprising position data for said first and/or said second lane image in the printed image; said streaming processor being configured to generate control signals for the printing means based on said first lane bitmap element, said second lane bitmap element, and said position signals in order to be able to adjust the position of said first lane image and/or the position of the second lane image in the printed image, and wherein said streaming processor is configured to receive first and second position signals comprising first and second position data for said first and said second lane image, respectively; and to use said first and second position signals for generating the control signals in order to be able to adjust the position of said first lane image and said second lane image independently, and wherein said first and second position data indicate a translation to be performed along a width direction perpendicular to the print direction for the first lane bitmap element and the second lane bitmap element, respectively.

18. Image processing system of claim 17, wherein said raster image processing and layout module is configured to be capable of converting source image data, into a first and second lane bitmap element having a first width and a second width seen in a direction perpendicular to the print direction, respectively, said first width being different from said second width.

19. Image processing system of claim 17, further comprising measurement means adapted for measuring the position of the first lane image and the second lane image in a printed image; and position correction calculation means configured for generating the position signals based on the measured position of the first lane image and the second lane image.

20. Image processing system of claim 17, wherein said streaming processor is further configured to receive instruction signals and to use said instruction signals for generating additional printing marks, such as cut marks or a calibration strip, in a printed image.

* * * * *